(12) United States Patent
Lu

(10) Patent No.: US 8,924,769 B2
(45) Date of Patent: Dec. 30, 2014

(54) SOFTWARE BURNING SYSTEM AND BURNING CONTROL METHOD

(75) Inventor: Yong-Liang Lu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/564,945

(22) Filed: Aug. 2, 2012

(65) Prior Publication Data

US 2013/0166958 A1 Jun. 27, 2013

(30) Foreign Application Priority Data

Dec. 20, 2011 (CN) .......................... 2011 1 0432959

(51) Int. Cl.
    *G06F 11/07* (2006.01)
(52) U.S. Cl.
    USPC .................................. 714/2; 714/1; 714/38.1
(58) Field of Classification Search
    CPC ....................................................... G06F 11/07
    USPC ................................................ 714/1, 38.1, 2
    See application file for complete search history.

(56) References Cited

U.S. PATENT DOCUMENTS

| 6,230,290 | B1 * | 5/2001 | Heidel et al. ................... 714/718 |
| 6,615,404 | B1 * | 9/2003 | Garfunkel et al. ............. 717/173 |
| 6,947,292 | B2 * | 9/2005 | Lin et al. ........................ 361/760 |
| 7,711,989 | B2 * | 5/2010 | Wang et al. ..................... 714/36 |
| 2006/0023560 | A1 * | 2/2006 | Tsai ............................... 365/232 |
| 2006/0047994 | A1 * | 3/2006 | Pu et al. ............................ 714/2 |
| 2006/0234632 | A1 * | 10/2006 | Lin et al. ...................... 455/41.2 |
| 2006/0236198 | A1 * | 10/2006 | Lintz et al. ..................... 714/758 |
| 2007/0015499 | A1 * | 1/2007 | Vikse et al. .................... 455/419 |
| 2008/0263532 | A1 * | 10/2008 | Yang et al. ..................... 717/168 |
| 2010/0180271 | A1 * | 7/2010 | Arsenault et al. ............. 717/168 |
| 2011/0154162 | A1 * | 6/2011 | Tseng et al. ................... 714/773 |
| 2012/0069674 | A1 * | 3/2012 | Lee ............................ 365/185.19 |
| 2012/0331280 | A1 * | 12/2012 | Lin et al. ........................... 713/2 |

FOREIGN PATENT DOCUMENTS

DE          10146611 A1 *   4/2003  ............. G06F 13/12

* cited by examiner

*Primary Examiner* — Chae Ko
(74) *Attorney, Agent, or Firm* — Novak Druce Connolly Bove + Quigg LLP

(57) ABSTRACT

A burning control method for burning software to at least one chip is provided, the method includes: controlling the at least one chip to enter a download mode when the at least one chip is startup; initializing the at least one chip when the chip enters the download mode; executing a burning process to burn software into the at least one chip when the chip is initialized; controlling the at least one chip to enter the test mode when the burning process is completed; testing whether the software has been burned into the at least one chip successfully when the at least one chip is in the test mode.

9 Claims, 2 Drawing Sheets

SOFTWARE BURNING SYSTEM AND BURNING CONTROL METHOD

BACKGROUND

1. Technical Field

The present disclosure relates to a burning system, particularly, to a software burning system and a burning control method.

2. Description of Related Art

Before an electronic device leaves the factory, software must be burned into chips of the electronic device, such as a display chip and a storage chip of a computer. Usually, when a number of chips are burned at the same time, the chip with the longest burning time of all of them must be set as the overall burning time by experience. After the burning, the electronic device should be set to a test mode by an operator to test whether the chips have been burned successfully. However, because a burning time of each chip is different because some chips are burned quickly and some chips are burned slowly. If all of the chips are tested after the longest burning time, time is wasted and it is inconvenient to set the electronic device to the test mode by the operator.

A software burning system and a burning control method to overcome the described limitations is thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described, with reference to the accompanying drawings.

Figure 1:
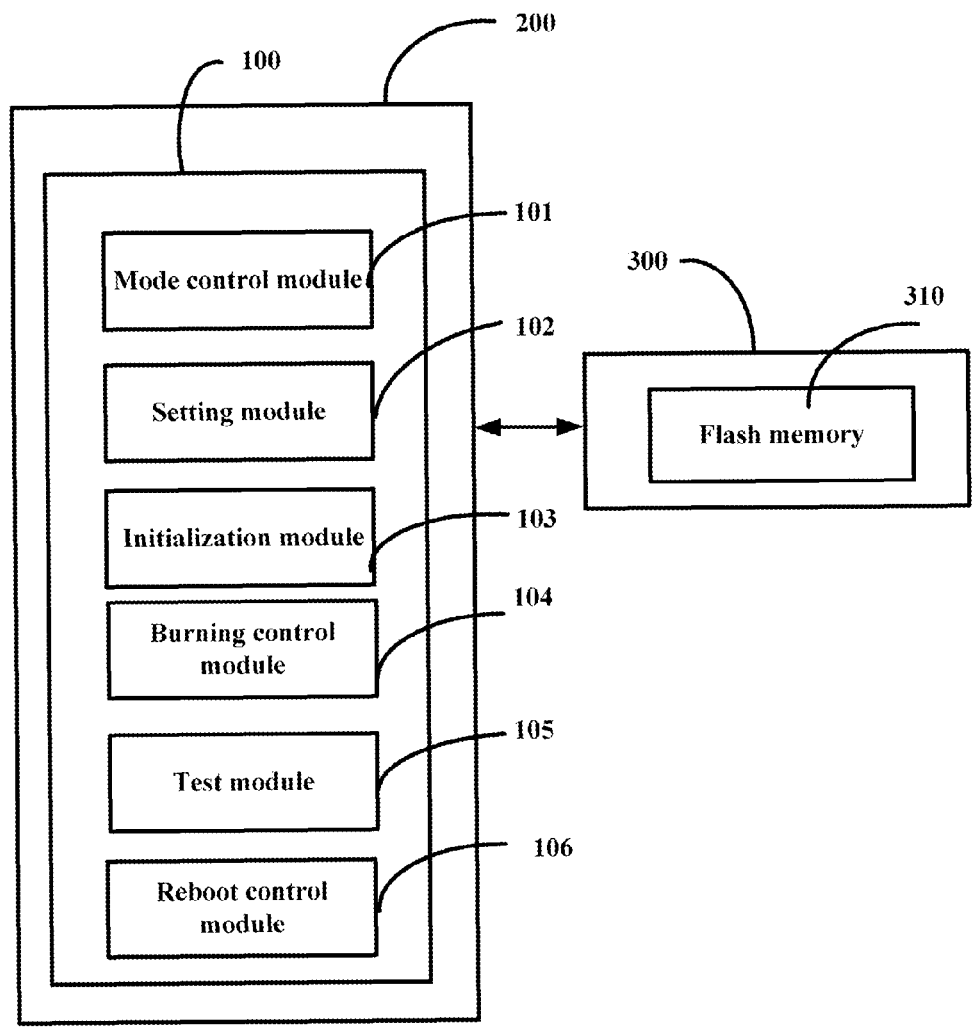
FIG. 1 is a block diagram of a software burning system, in accordance with an exemplary embodiment.

FIG. 1 shows a software burning system 100 for burning software into at least one chip 300 of an electronic device (not shown). The software burning system 100 is stored in a storage unit (not shown) of a burning device 200, such as a computer, and is run by a processor (not shown) of the burning device 200. The chip 300 includes a flash memory 310, and the software is burned into the flash memory 310 of the chip 300. In another embodiment, the software burning system 100 can be stored in the chip 300 which needs to be burned.

In one embodiment, each chip 300 has a mode flag, and a value of the mode flag can be set to indicate a download mode or a test mode of the chip 300. In one embodiment, a value "1" of the mode flag represents a download mode of the chip 300, and a value "0" of the mode flag represents a test mode of the chip 300. When the chip 300 is in the download mode, the software can be burned into the chip 300, and when the chip 300 is in the test mode, the chip 300 can be tested for the efficacy of the burning.

The software burning system 100 includes a mode control module 101, a setting module 102, an initialization module 103, a burning control module 104, a test module 105, and a reboot control module 106. The mode control module 101 is used to obtain the mode flag of the chip 300 and controls the chip 300 to enter the correct mode according to the value of the mode flag. For example, if the value of the mode flag is "1," the mode control module 101 controls the chip 300 to enter the download mode, and if the value of the mode flag is "0," then the mode control module 101 controls the chip 300 to enter the test mode.

In one embodiment, the moment the burning device 200 is connected to the at least one chip 300, the at least one chip 300 is subject to startup, and the setting module 101 sets the value of the mode flag of the chip 300 to "1" when the chip 300 is started up for the first time. The mode control module 101 then obtains the value of the mode flag of the chip 300, and controls the chip 300 to enter the download mode according to the value "1" of the mode flag of the chip 300. The initialization module 103 is used to initialize the chip 300 when the chip 300 enters the download mode, thereby clearing the flash memory 310 of the chip 300. The burning control module 104 is used to execute a burning process when the chip 300 is initialized. Namely, the burning control module 104 burns the necessary software into the chip 300 when the chip 300 is initialized. The setting module 102 sets the value of the mode flag of the chip 300 to "0" when the burning process has been completed. As described above, the mode control module 101 controls the chip 300 to enter the test mode if the value of the mode flag is "0." The test module 105 tests whether the software has been burned into the chip 300 successfully when the chip 30 is in the test mode. Therefore, the burning system 100 includes an automatic test of whether the software has been burned into the chip 300 successfully after the burning process is completed.

In one embodiment, if the test module 105 determines that the software has not been burned into the chip 300 successfully, the test module 105 produces a retest signal. The reboot control module 106 controls the chip 300 to reboot when receiving the retest signal, thereby restarting the chip 300. As described above, the setting module 102 sets the value of the mode flag of the chip 300 to "1" the moment the chip 300 is started up. Therefore, the mode control module 101 controls the chip 300 to once again enter the download mode when the chip has been rebooted. The initialization module 103 and the burning control module 104 repeats the process described above to burn the software to the chip 300.

In another embodiment, the value of the mode flag "1" can be used to represent the test mode, and the value of the mode flag "0" can be used to represent the download mode.

Figure 2:
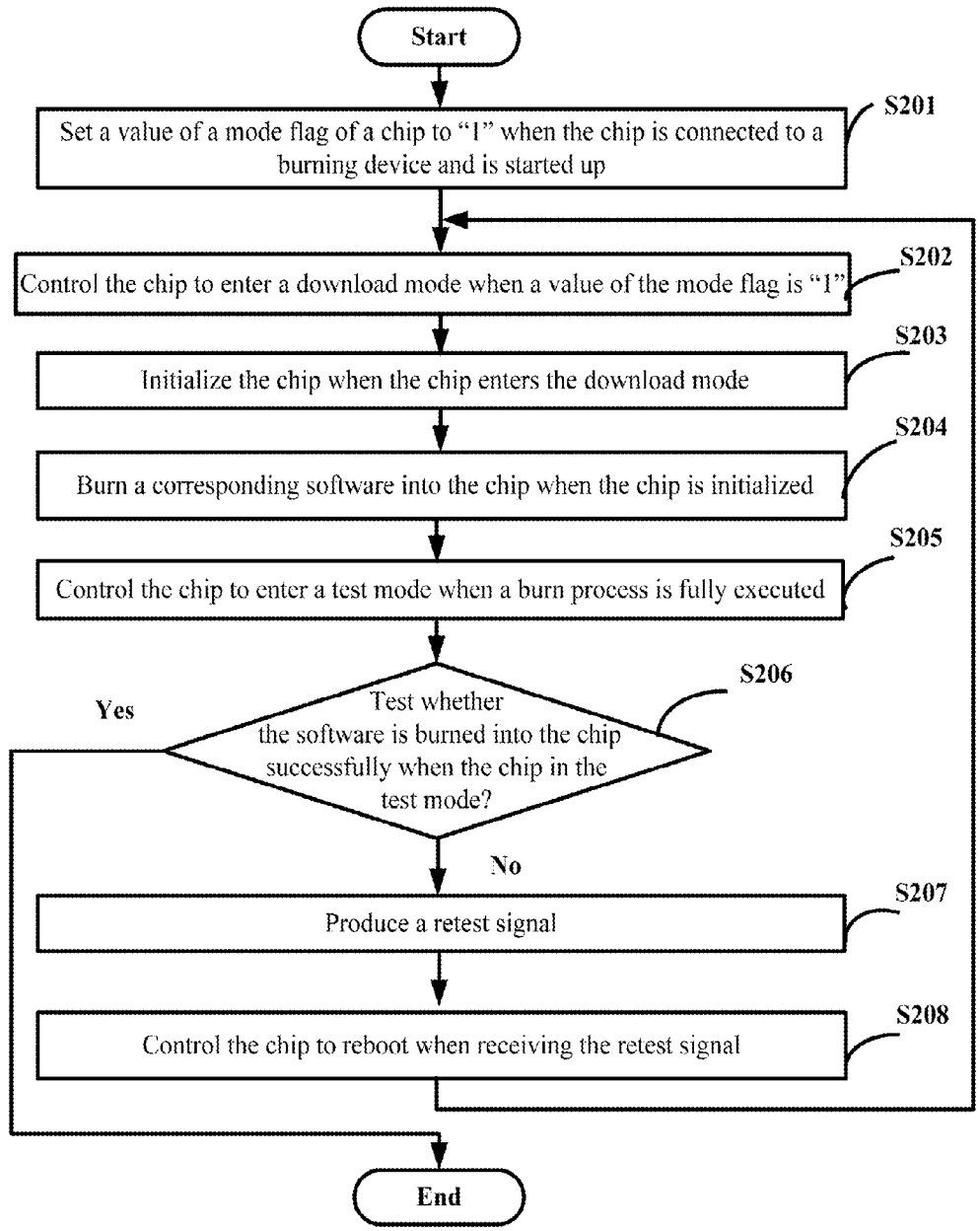
FIG. 2 is flowchart illustrating a burning control method, in accordance with an exemplary embodiment.

Referring to FIG. 2, a flowchart illustrating one embodiment of a burning control method is shown. In step S201, when the chip 300 is connected to the burning device 200, the chip 300 is subject to startup, and the setting module 102 sets the value of the mode flag of the chip 300 to "1" when the chip 300 receives the first startup.

In step S202, the mode control module 101 controls the chip 300 to enter the download mode when the value of the mode flag is "1".

In step S203, the initialization module 103 initializes the chip 300 when the chip 300 enters the download mode.

In step S204, the burning control module 104 burns a corresponding software into the chip 300 when the chip 300 is initialized.

In step S205, the setting module 102 sets the value of the mode flag of the chip 300 to "0" when the burning process has been fully executed by the burning control module 104, and the mode control module 101 controls the chip 300 to enter the test mode when the value of the mode flag of the chip 300 is "0."

In step S206, the test module 105 tests whether the software has been burned into the chip 300 successfully when the chip 30 is in the test mode.

If the test module 105 determines that the software is burned into the chip 300 successfully, the process ends, else, in step S207, the test module 105 produces a retest signal.

In step S208, the reboot control module 106 controls the chip 300 to reboot when a retest signal is received, and the process returns to step S201.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A software burning system, configured to burn corresponding software to at least one chip, the at least one chip comprising a mode flag, the software burning system comprising:
    a setting module configured to set a value of the mode flag of the at least one chip to a first value when the at least one chip is started up the moment that the at least one chip is connected to a burning device which runs the software burning system;
    a mode control module configured to obtain the value of the mode flag of the at least one chip, to control the at least one chip to a download mode when the value of the mode flag of the at least one chip is the first value;
    an initialization module configured to initialize the at least one chip when the at least one chip enters the download mode;
    a test module; and
    a burning control module configured to execute a burning process to burn a corresponding software into the at least one chip when the at least one chip is initialized;
    wherein the setting module is further configured to set the value of the mode flag of the at least one chip to a second value when the burning process has been fully executed by the burning control module, the mode control module is further configured to control the at least one chip to a test mode if the value of the mode flag is the second value; the test module is configured to test whether the software has been burned into the at least one chip successfully when the at least one chip is in the test mode.

2. The software burning system according to claim 1, wherein the test module is further configured to produce a retest signal when the test module determines that the software is burned into the at least one chip unsuccessfully.

3. The software burning system according to claim 2, further comprising a reboot control module, wherein the reboot control module is configured to control the at least one chip to reboot when receiving the retest signal.

4. The software burning system according to claim 3, wherein the software burning system is stored in the burning device.

5. The software burning system according to claim 3, wherein the software burning system is stored in the at least one chip which needs to be burned.

6. A burning control method comprising:
    controlling at least one chip to be burned to a download mode when the at least one chip is started up;
    initializing the at least one chip when the at least one chip enters the download mode;
    executing a burning process to burn corresponding software into the at least one chip when the at least one chip is initialized;
    controlling the at least one chip to a test mode when the burning process has been fully executed; and
    testing whether the software has been burned into the at least one chip successfully when the at least one chip is in the test mode.

7. The burning control method according to claim 6, further comprising:
    controlling the at least one chip to reboot if testing determines the software burned into the at least one chip was unsuccessful.

8. The burning control method according to claim 7, wherein the step of controlling the at least one chip to a download mode when the chip startups comprises:
    setting a value of the mode flag of the at least one chip to be burned to a first value when the at least one chip is started up; and
    controlling the at least one chip to a download mode when the value of the mode flag is the first value.

9. The burning control method according to claim 7, wherein the step of controlling the at least one chip to the test mode when the burning process is completed comprises:
    setting the value of the mode flag of the at least one chip to a second value when the burning process is completed; and
    controlling the at least one chip to the test mode when the value of the mode flag of the at least one chip is the second value.

* * * * *